(12) United States Patent
Buschelman

(10) Patent No.: US 11,974,035 B1
(45) Date of Patent: Apr. 30, 2024

(54) DEVICE TO CAPTURE HIGH RESOLUTION IMAGES OF A TRAIN AS IT PASSES THROUGH AN INSPECTION PORTAL

(71) Applicant: Ned Buschelman, Jacksonville, FL (US)

(72) Inventor: Ned Buschelman, Jacksonville, FL (US)

( * ) Notice: Subject to any disclaimer, the term of this patent is extended or adjusted under 35 U.S.C. 154(b) by 65 days.

(21) Appl. No.: 17/968,874

(22) Filed: Oct. 19, 2022

(51) Int. Cl.
*H04N 23/56* (2023.01)
*B61L 1/00* (2006.01)
*H04N 5/265* (2006.01)
*H04N 23/61* (2023.01)
*H04N 23/90* (2023.01)

(52) U.S. Cl.
CPC ............... *H04N 23/56* (2023.01); *B61L 1/00* (2013.01); *H04N 5/265* (2013.01); *H04N 23/61* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 9,446,776 B2 | 9/2016 | Cooper | |
| 9,607,446 B2 | 3/2017 | Cooper | |
| 10,518,791 B2 | 12/2019 | Singh | |
| 10,597,254 B2 | 3/2020 | Arndt | |
| 2007/0183936 A1* | 8/2007 | Newsam | G01N 21/78 422/400 |
| 2015/0225002 A1 | 8/2015 | Branka | |
| 2017/0066459 A1* | 3/2017 | Singh | H04N 23/90 |
| 2022/0377251 A1* | 11/2022 | Grata | H04N 23/51 |

FOREIGN PATENT DOCUMENTS

| | | |
|---|---|---|
| EP | 3 138 753 | 3/2017 |
| EP | 3 183 545 | 5/2020 |

* cited by examiner

*Primary Examiner* — Eileen M Adams
(74) *Attorney, Agent, or Firm* — Lawrence J. Gibney, Jr.

(57) ABSTRACT

Trains that pass through an inspection portal must be analyzed for structural integrity through the capture of high-resolution images of the train, the train cars and the associated parts of the train car (hoses, knuckles and wheels for example). A directed source of light using the correct camera placement and lighting for the cameras is provided to ensure that the images are the highest resolution possible with the environmental factors that are present. With the clear images that are provided the images are formed to provide an analysis of the integrity of the train.

2 Claims, 3 Drawing Sheets

DEVICE TO CAPTURE HIGH RESOLUTION IMAGES OF A TRAIN AS IT PASSES THROUGH AN INSPECTION PORTAL

FIELD OF THE INVENTION

Trains move at high speeds along parallel tracks; these tracks may be in remote areas. It is imperative that the safety of the train is maintained during this travel. As the train moves along tracks, it will pass through a portal. In the railway inspection portal, high resolution images of the train are taken of a train traveling at speeds approaching sixty-five miles per hour. Cameras and lighting are strategically placed to maximize the gathering of information. Some of the needed information concerns the proper placement of hoses as well as the condition of the mechanical parts of the train.

Each portal is a structure with defined side walls and a defined top through which the train will pass. The tracks on which the train travels go through the center of the portal. The portal is designed to allow the free passage of the train as it moves through the portal. The portal will be supported by trusses on either side of the portal and trusses on the top of the structure.

This application teaches a device that will allow the user to take high resolution images of a moving train using a plurality of line scan cameras that are mounted to the trusses of the inspection portal through which the train will pass. One of the challenges for taking high speed images in this environment is the presence of airborne contaminants that will affect the image(s) that is being taken. This interference can be caused by debris or dust that can interfere with the camera view by producing smudges on the lens of the camera. If a smudge appears on the camera lens, the presence of ambient light will accentuate the smudge on the camera lens, and this will cause a distorted image. Additionally, ambient light might distort the image because of the effect of the light on the camera. Both these issues (contaminants and ambient light) will produce low quality images.

In this application, a clear lens cap is placed over the camera lens and helps to direct the line of sight for the camera lens while at the same time to protect the lens from the inevitable dirt and airborne contaminants. After the lens cap is installed, a pair of blinders (referred to a duckbills in the industry) are mounted on the side(s) of the camera to reduce the interference of the inevitable airborne contaminants that will be present in the field. The blinders will block most of the airborne contaminants as well as any ambient light that may negatively impact the image that is produced.

A plurality of LED lights that surround the camera placement will activate once the train approaches the portal. A principal advantage of LED lights is the intensity of the light that will be produced quickly. A disadvantage to LED light is the intense heat that is generated by this type of lighting; however, the lights will cycle off once the train has passed through the portal.

PRIOR ART

There are many prior art references that discuss cameras and directing the camera to take an image of a moving object whether that object is a moving train or items on a conveyor belt. Trains produce unique challenges in terms of the ability to take high resolution images because of the speed of the train, the environment in which a train will operate as well as the changes in lighting in the area. Trains are routed through areas that contain large amounts of debris and are typically away from densely populated areas. A representative example of the type of devices that are used to capture images can be found at Coutta U.S. Pat. No. 3,935,380. This teaches a method and device to capture images using a surveillance system. Similarly, another example can be found at Coutta, U.S. Pat. No. 4,027,329. While the Coutta references do not specifically teach systems that are used in a train-based application it does teach the equipment that is used in this type of system; the type of equipment that is used (cameras, lighting) is not novel. However, it is the placement of the components of the system that is novel in this case. Other examples that can be found in the prior art include Phillips U.S. Pat. No. 8,505,461 and Phillips U.S. Pat. No. 8,660,698 that teach live inspection robots. Neither Phillips references discuss the use of this device in a train environment that has its own unique challenges.

BRIEF DESCRIPTION OF THE INVENTION

Trains are comprised of multiple cars that are joined together and travel on tracks at high rates of speed. There are many mechanical parts to a train including the connecting knuckles, hoses, wheels and all the associated bearings and other ancillary pieces of equipment. If a failure of a mechanical part occurs, the train may fail and risk property damage and personal injury and even death. It is imperative that appropriate safeguards are maintained to insure the structural integrity of the train as it travels along the tracks.

Trains travel in remote areas through portals that allow the inspection of the train cars from all sides—top, bottom, and sides—including the areas between the train cars. This application will capture high resolution images of the train from all perspectives as it travels through the portal.

These images are captured as the train travels through the portal and allow high speed images of the top, bottom, and sides of the train in slices of images which are then restitched together or reassembled to form the train. Software will allow the images to be reassembled and transmitted to a remote facility for analysis.

The portals through which the train will pass are in remote locations and subject to all types of environmental conditions. Some of the features of the portals would include the actual structure as well as the lighting and cameras that have been placed on the trusses of the portal. In the prior examples of a portal inspection device, stadium lighting is used to illuminate the area as the train passes through the portal. Stadium lights illuminate an arc of between 23 and 25 degrees. A bank of stadium lights are placed on trusses on opposite sides of each other. This arrangement can result in poor image quality because of excessive lighting which may produce shadows.

In this improvement, banks of LED lights are used with line scan cameras to capture all sides of a moving train as it moves through a portal.

While there is likely to be some site-specific requirements, line scan cameras would be positioned on the sides of the truss and the lighting modules would provide light so that images approximately one pixel in length could be taken. This narrow focus of lighting will produce a better quality image of the train as it moves through the portal.

Line scan cameras will also be positioned on the top of the interior of the truss to capture high resolution images as it passes through the portal. The cameras on the top of the interior of the truss will be positioned to ensure that excessive light is not produced to enable the cameras to capture the image of the knuckle and other connecting pieces between train cars; if an excessive amount of light is focused on the center space it will produce poor resolution images and the cameras on the top of the truss create an area of darkness that will provide enough illumination to capture a high resolution image of the top of the train and connections between cars as it passes through the portal.

In order to ensure a directed light source without excessive debris, a set of flaps or "duckbill" plates are provided on the line scan cameras to eliminate shadowing that may be caused by ambient lighting factors. Line scan cameras are designed to produce images that are very narrow in scope.

NUMBERING REFERENCES

1 Train inspection portal
2 Side Walls of Truss
5 Side line scan Camera
6 Top Line scan camera for tops of rail cars
7 Top Line scan camera for knuckles and flat cars
10 Duckbill Plates
15 Bank of LED lights
20 Roof
30 Dark Area
35 Software
40 Controller
45 Artificial Intelligence component

DETAILED DESCRIPTION OF THE EMBODIMENTS

Figure 1:
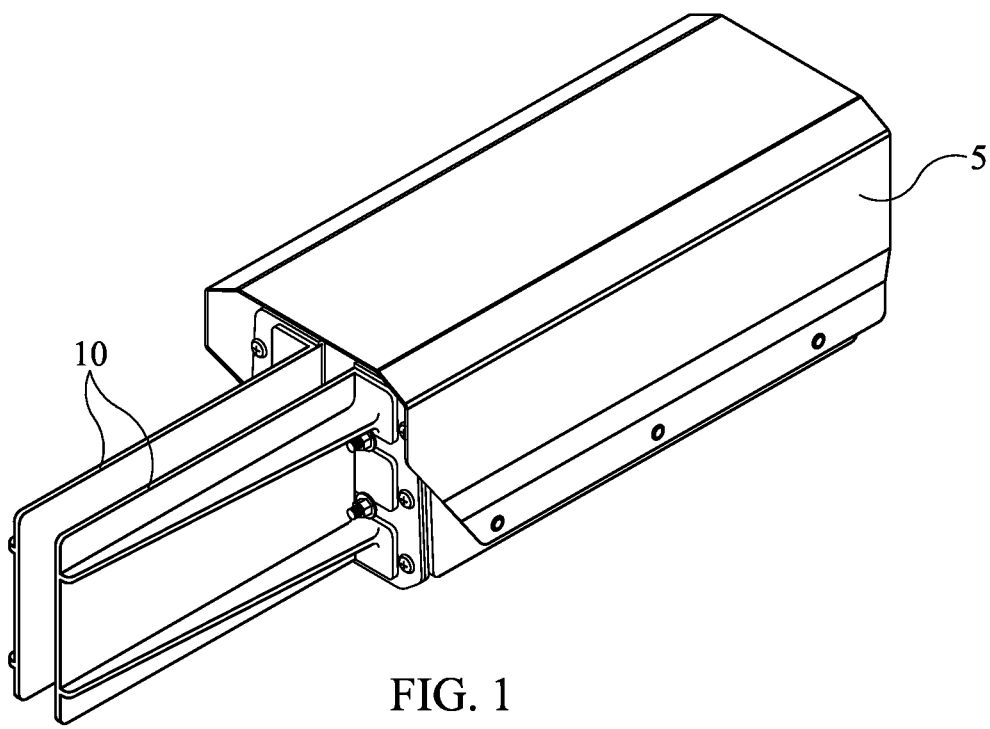
FIG. 1 is a perspective view of the line scan camera with duckbill plates
Figure 2:
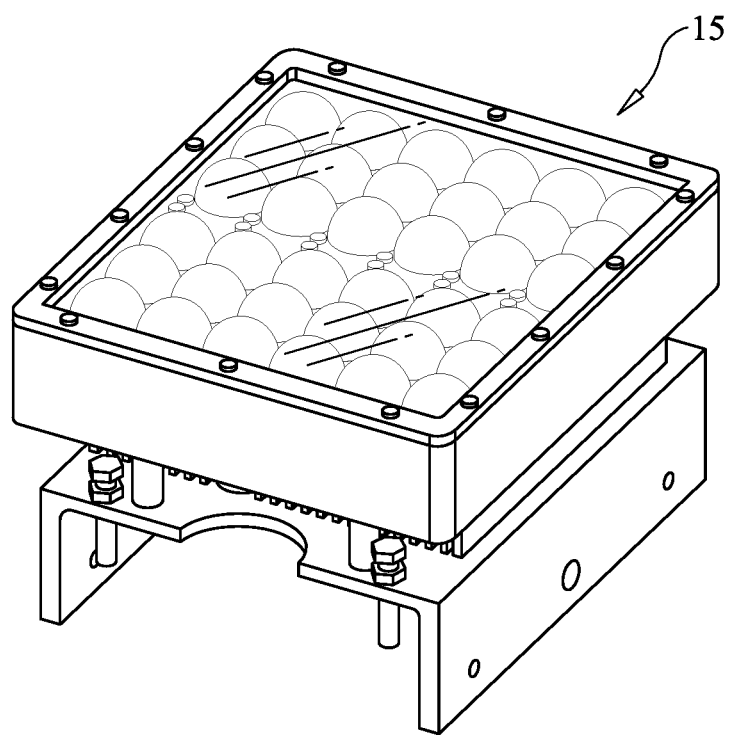
FIG. 2 is a perspective view of the LED light
Figure 3:
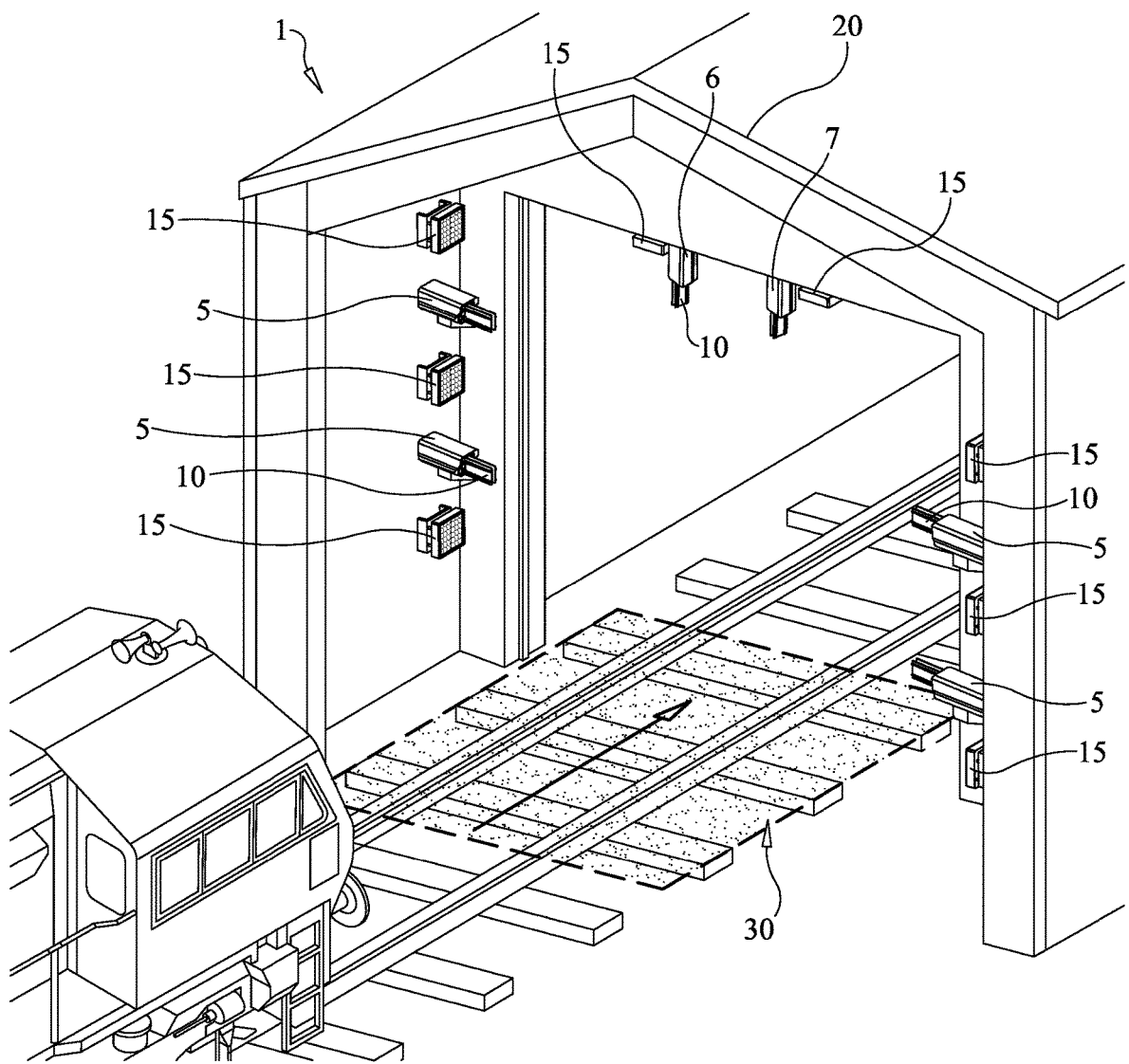
FIG. 3 is a depiction of the line scan cameras and LED lights on one side of the truss through which the train passes
Figure 4:
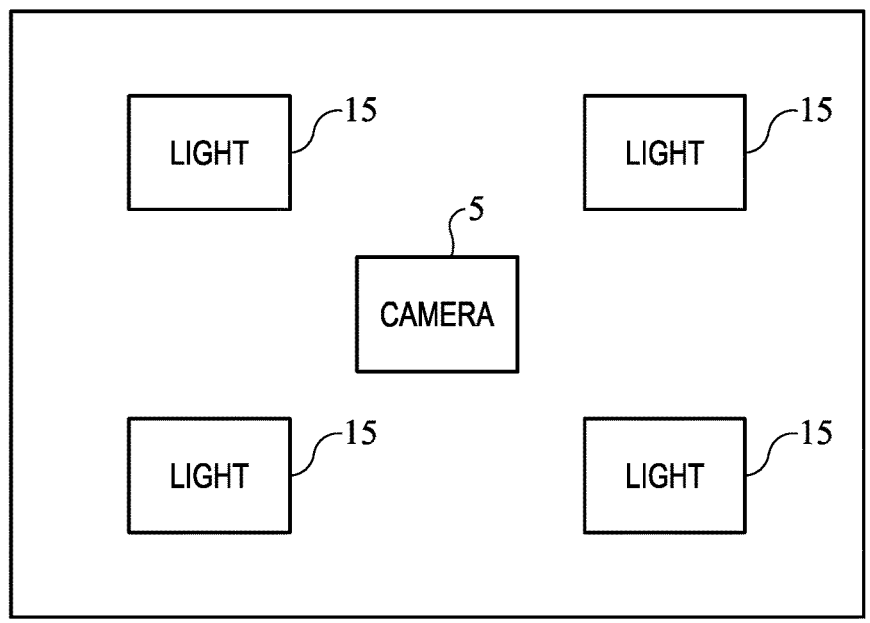
FIG. 4 is a depiction of the placement of the LED lighting in relationship to the camera

A train inspection portal 1 is a large fixed structure with defined walls 2 and roof 20 through which a train will pass. The structure is erected and secured and able to withstand extremes in environmental and weather conditions. The train will move through the opening in the portal as depicted in FIG. 3. The opening of the portal 1 will not interfere with the passage of the train as it moves on the tracks.

As the train approaches the portal, a plurality of LED lights 15 that are positioned on both sides of the interior of the truss side are activated. It is anticipated that a bank of LED lights will be positioned above, between and below a plurality of line scan cameras that are positioned on the interior sides of each truss. Between the bank of LED lights line scan cameras 5 have been positioned; it is anticipated that at least three line scan cameras are placed on each interior side of the truss as depicted in FIG. 3. Line scan cameras are specifically designed to capture images in very narrow widths. A pair of duckbill plates 10 are attached to the each line scan camera 5. The duckbill plates 10 will protect the lens and lens cover of the line scan camera 5 from any damage to the lens resulting from debris that may include rocks, gravel and sand and minimize the effects of shadowing from ambient light.

The cameras 5 and lighting 15 that are positioned on the respective sides of the truss are offset from each other to prevent direct light interfering with the capture of images from the line scan cameras on the opposite interior side of the truss as the train passes through the portal.

The line scan cameras that are mounted to the interior side of the inspection portal will capture multiple high-resolution images of each of the train cars as the train passes through the portal Software 30 (not depicted) that is included will gather the images and then restitch the images to form a train. Artificial intelligence 45 will be incorporated into the software 35 to detect any anomalies as the images are gathered and then restitched.

Other line scan cameras 6 and 7 will also be placed on the interior of the top of the truss to gather images from the viewpoint of looking down on the train as it passes through the portal 1. A bank of LED lights 15 will be positioned to either side of the cameras 6 and 7. The cameras, 6 and 7, will be positioned apart a sufficient distance from each other to prevent the intrusion of light to distort the resolution of the images. One of the line scan cameras 6 on the interior of the top of the truss will be configured to capture the top of a rail car. The other line scan camera 7 on the interior of the top of the truss will be configured to capture images of rail cars that are flat and capture images of the knuckle assembly between each railcar.

Figure 5:
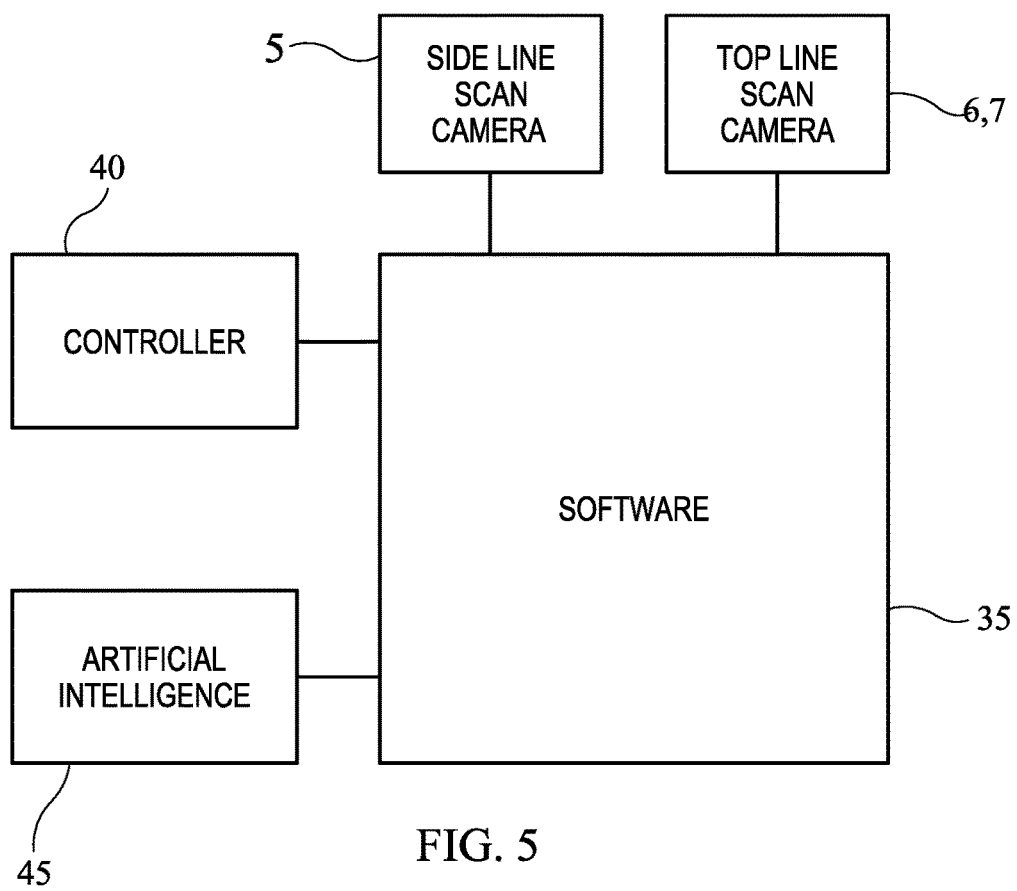
FIG. 5 is a schematic of the components of the device

The upper line scan cameras and LED lighting will be positioned such that the cameras will capture high resolution images from a top view of the train. This will include establishing a dark field 30 so that a high-resolution image may be captured from the top view of the train such as depicted in FIG. 5.

A controller 40 (not depicted) operates the various components and the timing of the operation of the sideline scan cameras and upper line scan cameras and the lighting. As the train approaches the portal 1 the controller will activate the LED lighting 15 and the line scan cameras for both the side line scan cameras 5 and the top line scan 6, 7 cameras will activate. The shutter speed of the line speed cameras will be controlled by the controller 40 and associated software 35. The software determines the speed of the train and controls the shutter speed of the line scan cameras, 5, 6, 7.

As the train approaches the entrance to the portal 1 the LED lighting 15 will be activated to direct high intensity light on the train as it passes through the portal. Once the train has passed through the portal the LED lighting 15 and the line scan cameras that have been placed on the interior sides 5 and upper interior structure 6, 7 are deactivated.

The software 35 will gather the images from the line scan cameras in small increments and will restitch the images from the side line scan cameras 5 and upper line scan cameras 6,7 to form a complete train. The restitched train can be forwarded to a remote location for analysis.

On the interior surface of the portal stadium lighting 25 is used to provide illumination for different scan cameras (not depicted). Stadium lighting produces between twenty-three and twenty-five degrees of arc of light and is needed to be used with other area cameras.

In order to eliminate shadowing, the upper line scan cameras 6, 7 will be directed downward at an angle to capture images of the train from a top view and produce a dark area in the area of the train as it passes through the portal 1. The lighting for the upper line scan cameras will be positioned so that a dark field 30 will be produced such as depicted in FIG. 5. If the lighting illuminates the entire area, the top line scan cameras 6, 7 will not produce high resolution images because excessive illumination will be reflected back towards the top line scan cameras 6, 7.

The invention claimed is:

1. A device to capture high resolution images of a train as it passes through an inspection portal which is comprised of:
a. an inspection portal wherein the inspection portal has a defined structure; wherein the structure has defined walls; wherein the structure has a defined top; wherein a train passes through the opening of the portal; b. a plurality of line scan cameras; wherein some of the plurality of line scan cameras are mounted to the side of the interior of the portal; wherein some of the plurality of line scan cameras are mounted to the top structure of the interior of the portal; wherein the plurality of line scan cameras on the side of the portal are offset horizontally from each other; c. a pair of line scan cameras on the interior of the top surface of the portal; wherein the pair of line scan cameras on the interior of the top surface of the portal are pointed down toward the track; wherein LED lights surround the plurality of line scan cameras; wherein one of the plurality of line scan cameras on the interior of the top surface of the portal is configured to gather images of the top of the railcar; wherein one of the plurality of line scan cameras on the interior of the top surface of the portal is configured to gather images of the knuckle assembly of the train; d. duckbill plates; wherein a pair of duckbill plates are placed on each of the plurality of line scan cameras; e. a means of illumination; wherein the means of illumination are positioned around the plurality of line scan cameras; wherein the means of illumination is LED lighting;
f. software; wherein a controller is provided; wherein the software controls the activation of the means of illumination; wherein the software controls the deactivation of the means of illumination; wherein the software controls the shutter speed of the plurality of line scan cameras; wherein artificial intelligence is incorporated into the software.

2. The device as described in claim 1 wherein the plurality of line scan cameras that are mounted to the interior surface of the top of the portal are angled inward and downward.

* * * * *